United States Patent [19]

Klos et al.

[11] Patent Number: 4,931,776

[45] Date of Patent: Jun. 5, 1990

[54] FLUID FLOW SENSOR WITH FLEXIBLE VANE

[75] Inventors: Leo V. Klos, Newburyport; Richard J. Hertel, Boxford, both of Mass.

[73] Assignee: Varian Associates, Inc., Palo Alto, Calif.

[21] Appl. No.: 195,988

[22] Filed: May 19, 1988

[51] Int. Cl.⁵ .............................................. G08B 21/00
[52] U.S. Cl. ................................. 340/610; 73/861.74;
  116/273; 200/81.9 R
[58] Field of Search .............................. 340/610, 606;
  73/861.74, 861, 861.21, 861.35, 861.75, 861.76,
  861.71, 753; 200/6 C, 16 D, 61.25, 81.9 R, 81.6,
  81 R, DIG. 5, 31; 116/112, 266, 273;
  137/101.21

[56] References Cited

U.S. PATENT DOCUMENTS

| 827,698 | 8/1906 | Adams | 340/610 |
|---|---|---|---|
| 2,952,753 | 9/1960 | Kmiecik et al. | 73/861.74 |
| 3,065,316 | 11/1962 | Olson | 340/610 |
| 4,136,330 | 1/1979 | Estaque | 340/610 |
| 4,282,413 | 8/1981 | Simons et al. | 340/610 |
| 4,729,244 | 3/1988 | Furuse | 73/861.74 |

FOREIGN PATENT DOCUMENTS

| 2620460 A1 | 5/1976 | Fed. Rep. of Germany. |
| 3136989 A1 | 9/1981 | Fed. Rep. of Germany. |
| 1308963 | 12/1961 | France. |
| 0208414 | 12/1982 | Japan ........................... 73/861 |
| 2042191A | 9/1980 | United Kingdom. |

OTHER PUBLICATIONS

European Search Report, 23-08-1989-EP89304947.8.

Primary Examiner—Joseph A. Orsino
Assistant Examiner—Jill Jackson
Attorney, Agent, or Firm—Stanley Z. Cole; Gerald M. Fisher; Terrence E. Dooher

[57] ABSTRACT

A flow sensor for regulating the air flow rate to a cooling system can be formed as a housing for channeling the flow through a retangular cavity and a one piece vane of bent metal strip which deflects and closes an electrical contact at a predetermined air flow rate and opens when the air flow rate falls below a preset threshold level.

4 Claims, 1 Drawing Sheet

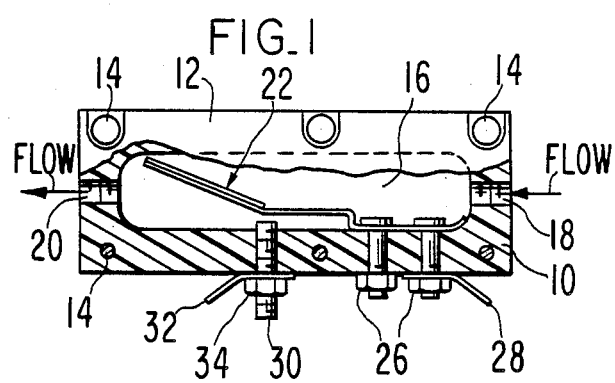
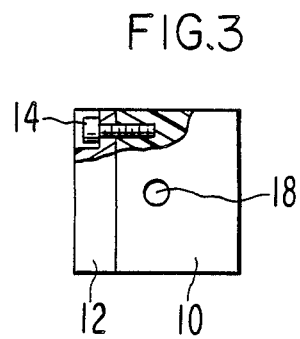
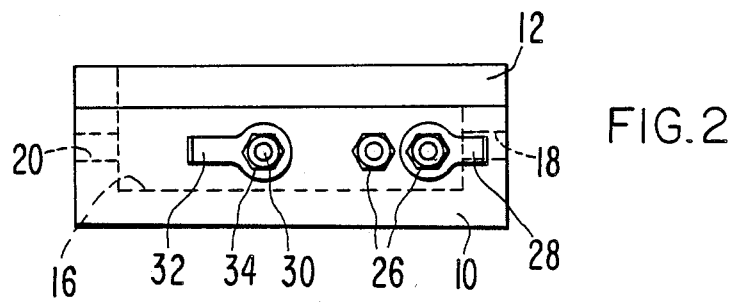
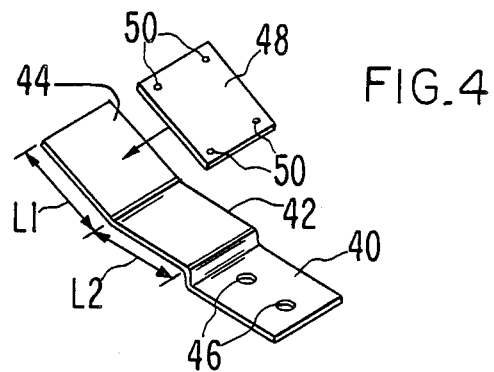
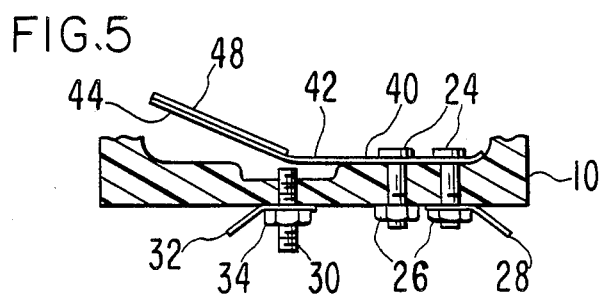

FLUID FLOW SENSOR WITH FLEXIBLE VANE

FIELD OF THE INVENTION

This invention pertains to a fluid flow sensor for sensing the flow of fluids, in particular to an air flow sensor having high sensitivity at low air flow rates for cooling systems.

BACKGROUND OF THE INVENTION

Many complex machines used in modern industry have numerous sophisticated components which generate heat but can be easily damaged if the temperature of the component is too high. Automatic cooling is extensively used in such machines to prevent temperature rise.

Flow sensors are used in a variety of systems to measure, regulate or control the flow of fluids. An important application of such sensors is to insure that the flow of cooling fluids to a sensitive component does not drop to the point where the component is damaged. Such a fluid flow sensor would therefore measure the flow rate and compare it to a preset threshold. If the flow rate drops below the threshold, and electrical signal is sent to the controls of the system to take predetermined corrective action before serious damage occurs. In sophisticated industrial machines, space is at a premium. Such sensors must be kept small, inexpensive, rugged and sensitive.

In the prior art there are flow sensors which use balls inside transparent tubes. The air flow in the tube must be upward to oppose gravity. The ball rests on a support when there is no flow or low flow. A sufficient flow rate causes the ball to rise to a level where the position of the ball is detected by a light source and light sensor. This type of sensor is large, fragile, and suitable for use in one position only.

Another type of sensor uses a magnet attached to a spring inside the air flow tube. A reed switch outside the tube detects the movement of the magnet due to a change in flow. Friction between the magnet and the walls of the tube causes the flow rate at which the switch is closed to differ from the flow rate at which it is opened by 50%.

There are also flap switches in the prior art which use a hinged flap inside the flow to trigger a microswitch. The mechanical linkage, again, causes friction which causes great differences between the flow rate at which the switch is opened and the flow rate at which it is closed.

OBJECTS OF THE INVENTION

An object of the invention is to provide a fluid flow sensor which is sensitive to a drop in flow rate of cooling fluid below a preset threshold.

A further object of the invention is to make such a sensor small and rugged.

Another object of the invention is to make the pressure drop across the sensor small.

Another object of the invention is to make the sensor operate in any orientation.

Another object of the invention is to make the sensor sensitive to small change in flow rate near the threshold without causing oscillation of the sensor's signal.

A still further object is to make such a sensor inexpensive.

SUMMARY OF THE INVENTION

These objects of the invention and other objects, features and advantages to become apparent as the specification progresses are accomplished by the invention according to which, briefly stated, the sensor is a small vane of flexible material which bends in the fluid flow to touch an electrical contact when the flow rate is above a first limit and which does not touch the electrical contact when the flow rate falls below a threshold value. The sensor is made sensitive by keeping the flexible material thin, but insensitive to oscillations by making the outer extremity of the vane thicker and heavier.

This sensor can be made quite small, less than 2 inches on its longest side, and quite sensitive, less than 10% change in flow is required between interruption and recontact or closing. The sensor also has a very small pressure drop across it, approximately 1 psi and operates in any orientation. The sensor of the invention works well in a low flow regime, 5 to 50 SCFH, and where flow is laminar and is rugged and inexpensive.

These and further constructional and operational characteristics of the invention will be more evident from the detailed description given hereinafter with reference to the figures of the accompanying drawings which illustrate one preferred embodiment and alternatives by way of non-limiting examples.

BRIEF DESCRIPTION OF THE DRAWINGS

FIG. 1 is a top view in partial section of the sensor of the invention.
FIG. 2 is a side view of the sensor of FIG. 1.
FIG. 3 is an end view of the sensor of FIGS. 1 and 2.
FIG. 4 is a perspective view of the vane of the sensor.
FIG. 5 is a sectional view of an alternate embodiment of the sensor.

Lexicon

The following is a listing of terms, abbreviations, and definitions used throughout this specification.

SCFH: standard flow in cubic feet per hour, at standard conditions of temperature and pressure.

Delta: the difference between air flow rate at recontact and air flow rate at interruption of contact as a percentage of airflow rate at recontact.

Glossary

The following is a glossary of elements and structural members as referenced and employed in the present invention.
10—housing
12—housing cover
14—screws for fastening cover to housing
16—elongated cavity
18—inlet hole
20—outlet hole
22—vane assembly
24—screws
26—nuts
28—first connection tab
30—set screw
32—second connection tab
34—nut
40—mounting portion of the vane 22
42—contact portion of the vane 22
44—distal portion of the vane 22
46—holes in the mounting portion 40
48—thickening portion 50—spot welding attachment points

DETAILED DESCRIPTION OF THE PREFERRED EMBODIMENTS

Referring now to the drawings wherein reference numerals are used to designate parts throughout the various figures thereof, there is shown in FIGS. 1-3 three orthogonal views of the sensor of the invention.

The sensor has a housing 10 preferably made of transparent hard plastic and a cover 12 of the same material. The cover 12 is attached to the housing 10 with approximately 6 screws 14. The attachment is sufficiently tight to form an air tight seal. Within the housing 10 there is formed an elongated cavity 16 which is approximately rectangular. At opposite ends of the cavity 16 there is provided an inlet hole 18 and outlet hole 20 with suitable fittings for attachment to an air flow line (not shown).

Within the cavity 16 a vane assembly 22 of thin welded metal is attached to the housing 10 with screws 24 and nuts 26. A first electrical connection tab 28 is attached to one of the screws 24 on the outside of the housing 10 to provide an electrical connection point to the vane assembly 22. The holes in the housing 10 through which the screws 24 are passed are sufficiently large to clear the threads on the screws 24.

A set screw 30 is attached to the housing 10 through a threaded hole in the housing. A second electrical connection tab 32 is held on with the set screw 30 with a nut 34. In operation, the sensor is connected serially in a fluid flow line. A pumping means (not shown) pumps fluid through the fluid flow line and the sensor. As the flow rate through the sensor is increased from zero, at some first limit point, called the flow rate at closing (or the flow rate at recontact), it becomes sufficient to elastically bend vane 22 to contact set screw 30, so that an electrical connection path is made from first tab 28 through screw 24, vane 22 and set screw 30 to second tab 32.

If the flow rate is then decreased, at some second limit point less than the first limit point, the flow rate becomes insufficient to maintain contact between vane 22 and set screw 30 and the electrical connection between vane 22 and set screw 30 is interrupted as the vane elastically returns to the position shown in FIG. 1. In general, this second limit point, the flow rate at which this electrical connection is interrupted when the flow rate is decreasing, is called the threshold of the sensor. The threshold is preset to a desired level by adjusting set screw 30.

The vane 22 functions in three ways. It is a leaf spring, it is an electrical path and it is a flow deflector. The vane 22 has three portions which together accomplish these functions. As shown in FIG. 4, the vane 22 is formed, a mounting portion 40, a contact portion 42 generally parallel to the mounting portion and a distal portion 44 formed at an angle to the contact portion. The vane may be formed of one strip of metal such as 0.002 inch thick type 302 stainless steel. The mounting portion 40 has holes 46 through which the vane 22 is mounted to the housing 10 with the screws 24.

In the embodiment shown in FIG. 4, the contact portion 42 is offset from the mounting portion 40 to provide clearance from the housing 10 for the set screw 30. In an alternate embodiment shown in FIG. 5, the vane can be formed without the offset and the offset can be provided in the housing 10.

To provide good sensitivity the set screw 30 is placed in the housing 10 at the end of the contact portion 42 nearest the distal portion 44. Also to provide good sensitivity, the length L1 of the distal portion 44 should be longer than the length L2 of the contact portion 42. We have found it best to make L1 approximately twice L2. To dampen fluttering of the distal portion 44 in the air flow, it is advantageous to make the distal portion 44 stiffer and more massive than the contact portion 42. This can be accomplished by fastening a thickening portion 48 to the distal portion 44. The thickening portion 48 can, for example, be a similar shaped sheet of the identical material and the fastening can be by spot welding at four attachment points 50. The attachment of the thickening portion 48 stiffens and increases the mass of the assembly and reduces the frequency of oscillation, thereby insuring crisp switch contacts.

The sensor, according to the invention, has a very small delta. Delta here is taken to be the percent difference between the flow rate at closing (or recontact) when contact is made between vane 22 and set screw 30 and the flow rate at interruption of contact. Symbolically, $$\Delta = \frac{\text{flow rate at closing} - \text{flow rate at interruption of contact}}{\text{flow rate at closing}}$$

Because of internal friction, delta can be large in most prior art sensors. Let us consider a hypothetical example to show the importance of a small delta. The component to be protected requires a flow rate of 16 SCFH. If the threshold (the flow rate at interruption of contact) is set at 16 SCFH and if the delta is 50%, the flow rate must be 32 SCFH or above to ensure contact. Thus, with a high delta, an excessively high flow rate is necessary to operate the sensor. If the delta can be reduced to less than 10%, as in the invention, then the flow rate could be set as low as 18 SCFH to make contact and be sure contact will be interrupted at slightly above 16 SCFH.

While the invention has been described in one embodiment as a sensor for monitoring the flow rate of cooling air, the invention is not limited to such applications. For example, the sensor may be used to monitor the flow rate of a non-electrically conductive gas in a line which provides the gas to be bubbled through a solution. Similarly, the sensor can monitor the flow rate of non-conductive liquids as well as gases.

This invention is not limited to the preferred embodiment and alternatives heretofore described, to which variations and improvements may be made including mechanically and electrically equivalent modifications to component parts, without departing from the scope of protection of the present patent and true spirit of the invention, the characteristics of which are summarized in the following claims.

What is claimed is:
1. A fluid flow sensor comprising:
   a body having an internal cavity and a first opening for conveying fluid into said cavity and a second opening for conveying fluid out of said cavity;
   a thin flexible vane comprising a mounting portion, a contact portion including a first electrical contact means, and a distal portion, said mounting portion being fixedly mounted to said body, said contact portion being intermediate said mounting portion and said distal portion;

second electrical contact means inside said cavity;

first conduction means for conducting electricity between a point outside said body and said first electrical contact means; and second conduction means for conducting electricity between a point outside said body and said second electrical contact means, said distal portion of said vane being disposed at an angle relative to said contact portion so that fluid flowing through said cavity from said first opening to said second opening causes said vane to elastically bend so that said first electrical contact means contacts said second electrical contact means when the rate of flow of said fluid is above a first limit point and said first electrical contact means to not contact said second electrical contact means when the rate of flow of said fluid is below a preset threshold level which is less than said first limit point, said first electrical contact means remaining in contact with said second electrical contact means when said rate of flow decreases from above said first limit point until said rate reaches said preset threshold level.

2. A fluid flow sensor as in claim 1 further including means for adjusting said threshold level.

3. A fluid flow sensor as in claim 1 wherein said distal portion of said vane is heavier than said contact portion of said vane.

4. A fluid flow sensor as in claim 1 wherein said distal portion of said vane is longer than said contact portion of said vane.

* * * * *